June 28, 1932. F. GILBERT 1,864,901
AUTOMOBILE HEATING APPARATUS
Filed Dec. 11, 1929
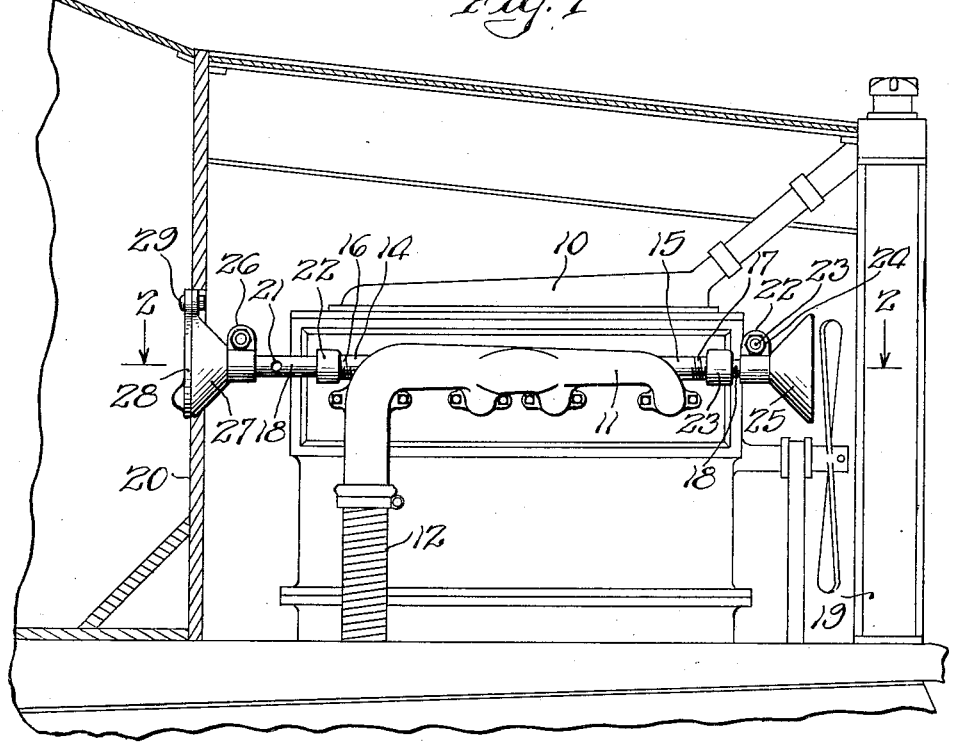
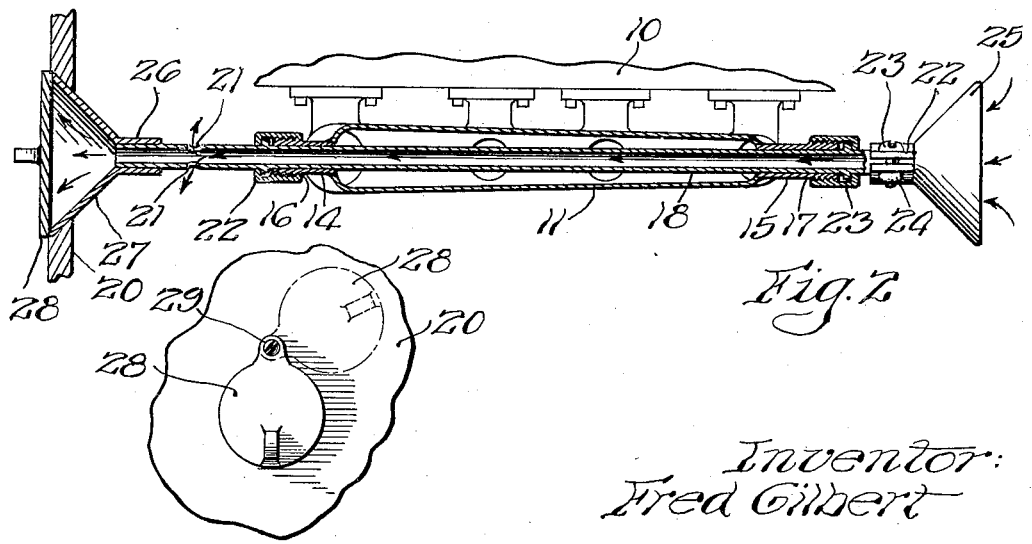
Inventor:
Fred Gilbert Patented June 28, 1932

1,864,901

UNITED STATES PATENT OFFICE

FRED GILBERT, OF OSWEGO, OREGON

AUTOMOBILE HEATING APPARATUS

Application filed December 11, 1929. Serial No. 413,238.

The present invention relates to an automobile heater and has particularly to do with a type of device which employs the exhaust manifold to heat atmospheric air and discharge such air into the body of a closed automobile.

For heating cars, a number of different instrumentalities have been proposed. Some of these employ the exhaust gases to circulate through a heater in the floor of an automobile. These heaters have not been satisfactory because of leakage of the exhaust gases into the car and because such gases constantly act on the heater making it necessary each spring and fall to disconnect and connect the heater. There has never been actual control of the heat in such a device.

Heaters warmed by the water circulating through the cooling system of water cooled motors have been employed to heat air which has been blown into the car from beneath the hood. There is a profound objection to this type of heater in that it takes air from about the rear of the engine which air frequently carries odors. There has been the further objection that such heaters are quite complicated devices.

The present invention is especially designed to heat fresh atmospheric air taken through the radiator at the front of the engine and introduce such air after heating into the body of the car, the primary heating being by the exhaust gases of the engine. Such heating is obtained by flowing the air over metal surfaces rendered hot by the application of the hot exhaust gases to the other surface thereof.

The objects of the invention, therefore, include, among other things, the following:

An improved heater adapted to be used upon the exhaust manifold of an automobile and providing for the introduction to the body of a motor car of atmospheric air properly heated.

An improved manifold for the exhaust gases of a motor and adapted to lend itself to the attachment of the heating device thereto.

An improved combination of elements forming a part of an exhaust manifold of a motor to provide means for heating the body of a car.

A heating device introducing fresh warm air to an automobile and which is readily attachable or detachable to the motor of such car.

These objects and such other objects as may hereinafter appear are obtained by the novel construction, unique arrangement, and improved combination of the several elements which constitute the single embodiment of the invention illustrated in the accompanying drawing and in which:

Figure 1 is a side elevation of an automobile engine, the dash and radiator of such automobile being shown in outline, providing a plan view of the heater forming the subject matter of the present invention;

Figure 2 is a transverse section along the line 2—2 of Figure 1; and

Figure 3 is an end elevation of the apparatus looking from the dash of an automobile.

Like reference characters are used to designate similar parts in the drawing and in the description of the invention hereinafter given.

The several figures, Figures 1, 2, and 3 inclusive, may be read conjointly.

The engine 10 shown is of the four cylinder type. The device is equally applicable to a six cylinder or an eight cylinder motor or to any other number of cylinders as will be manifest from the remarks which follow.

Upon the side of engine 10 is an exhaust manifold 11 which is of conventional configuration and adapted to receive the exhaust gases from the cylinders of engine 10 in timed relation and discharge such gases through an exhaust pipe 12 into a muffler not shown. A continuous flow of exhaust gases will be had through manifold 11 so long as engine 10 is operating.

At each end of the manifold 11 are threaded taps 14 and 15. These comprise short bodied sections integral with or firmly attached to the manifold 11 and opening thereinto. Each of the taps 14 and 15 has a threaded portion 16 and 17, respectively, the purpose of which will be shortly manifest. The taps 14 and 15 are in alignment.

In the summer time when a heater is not desired, each of these taps 14 and 15 may be closed by a cap, not shown, after the heater tube is removed from the exhaust manifold 11.

For winter use or when heat in the car is desired, there is inserted through the taps 14 and 15 a pipe 18 which is of sufficient length to reach from adjacent the radiator 19 at the front of the car to the dash 20 at the beginning of the closed portion of the car body.

Said pipe 18 is generally of uniform diameter and has as a part thereof a perforated section, the perforations being indicated by the numeral 21. The perforations 21, normally, are disposed adjacent to the outlet end of the pipe 18 and in proximity to the dash 20.

The pipe 18 is held within the manifold 11 by the nuts 22 and 23 which may be of any suitable type for gripping such pipe. A shoulder may be formed in the pipe 18 to prevent longitudinal displacement thereof or nuts may be used to compress the material of the taps 14 and 15 upon the pipe 18 to firmly hold such pipe in an adjusted position.

Adjacent the radiator 19 and attached to the pipe 18 by means of a clamping device 22 controlled by a nut 24 and bolt 23 is a funnel shaped member 25 into which air passing through the radiator 19 is introduced into the pipe 18 to pass therethrough for the purpose of heating such air anterior to its introduction into the body of the car.

As the air passes through the radiator 19 it is slightly warmed by the heat of that device but is further and principally heated by the much hotter exhaust gases as it travels through the pipe 18.

At the inner end of said pipe 18 is another clamping device 26 by which is secured to said pipe 18 another funnel shaped member 27, the open end of which is adapted to be disposed flush in the dash 20. Upon the funnel 27 is a cover 28 hinged or pivoted at 29 for movement across the mouth of member 27.

Air heated in pipe 18 may be excluded from the body of the car by placing the cover 18 across the mouth of the funnel 27. All of the air which will pass through the pipe 18 may be introduced into the car by swinging the cover 28 to an angle so that it does not obstruct the opening in the funnel shaped member. Other adjustments of the cover 28 admit selected portions of the heated air passing through the heated tube 18.

If it is desired, the tube 18 may be welded to or otherwise attached directly to the manifold or it may be secured with lock nuts or asbestos washers as is indicated above. The inner tube 18 may be of steel or of copper or of other suitable material.

The purpose of the apertures 21 is to prevent the stagnation of air in the device. It is for express purpose of removing the dead air. In the event air is shut off from the car itself, heated air will flow through the pipe 18 and be discharged through the openings 21, thereby causing a continuously changing supply of air to circulate through the tube 18 at all times.

When the cover 28 is open, the ready escape for the heated air is into the body of the car and at this time the apertures perform no active service except possibly to permit of the discharge of an excess of heated air, if any there be.

Of course, the funnel member 27 opening into the car may be disposed at any angle suitable to make it flush with the floor boards or dash of the car.

I claim:

A heater for use upon gasoline automobiles comprising a manifold upon the engine of said automobile to receive the exhaust gases, a tube adapted to pass through said manifold, there being threaded apertures in said manifold, locking means associated with said apertures for gripping said tube and sealing said manifold, a funnel shaped opening at the front end of said tube, a second funnel shaped member at the discharge end of said tube, and a cap for closing said discharge member, said tube adjacent said discharge member being apertured to allow the passage of air through said pipe when said discharge member is closed.

In witness whereof, I have hereunto set my hand this first day of November, 1929.

FRED GILBERT.